United States Patent [19]

Wilson

[11] Patent Number: 5,052,950
[45] Date of Patent: Oct. 1, 1991

[54] TERMINAL CONNECTOR HEAD

[75] Inventor: Richard F. Wilson, Fort Wayne, Ind.

[73] Assignee: Pyromation, Inc., Fort Wayne, Ind.

[21] Appl. No.: 567,299

[22] Filed: Aug. 14, 1990

[51] Int. Cl.$^5$ .............................................. H01R 9/18
[52] U.S. Cl. ...................................... 439/709; 174/59
[58] Field of Search ............................... 439/709–722, 439/166, 217; 174/59, 60, 52.1; 361/356

[56] References Cited

U.S. PATENT DOCUMENTS

| | | | |
|---|---|---|---|
| 1,028,254 | 6/1912 | Murray | 439/709 |
| 1,923,939 | 8/1933 | Lavarack | 361/356 |
| 2,247,646 | 5/1940 | Terry | 174/59 |
| 2,318,861 | 5/1943 | Huguelet . | |
| 2,557,818 | 6/1951 | Eddy . | |
| 2,788,472 | 4/1957 | Road et al. | 439/709 |
| 3,210,720 | 10/1965 | Harris, Jr. . | |
| 3,241,097 | 3/1966 | Ege | 439/908 |
| 3,355,697 | 11/1967 | Baranowski | 439/171 |
| 3,405,225 | 10/1968 | McHugh | 174/59 |
| 3,550,063 | 12/1970 | Lecocq . | |
| 3,684,846 | 8/1972 | McDaniels | 439/518 |
| 3,742,995 | 7/1973 | Confer | 264/277 |
| 3,757,282 | 9/1973 | Wildi | 439/709 |
| 3,766,513 | 10/1973 | Carre | 439/518 |
| 3,847,464 | 11/1974 | Pattee | 439/166 |
| 3,850,501 | 11/1974 | Butterfield et al. | 439/908 |
| 4,415,044 | 11/1983 | Davis | 174/59 |

FOREIGN PATENT DOCUMENTS

| | | |
|---|---|---|
| 156866 | 5/1978 | Netherlands . |
| 408893 | 4/1934 | United Kingdom . |
| 2131631 | 6/1984 | United Kingdom . |

OTHER PUBLICATIONS

Pyromation, Inc., catalog, "Accessories", pp. AC-1 through AC-4.
Thermoelectric Co., catalog, "Connection Heads," Industrial Thermocouples and RTD's, p. 5.
Burns Engineering, Inc., catalog, "Connection Heads", p. 24.
Honeywell, Inc., catalog, "Thermocouple Connection Heads", and Thermocouple Terminal Connectors, Section 2, pp. 32–33.
National Basic Sensor Co., catalog, "Components--Thermocouple Heads, Blocks and Fittings", p. 14.
Omega Engineering, catalog, "Thermocouple Heads", pp. B-15 through B-17.
Honeywell, Inc., catalog, "Thermocouple Principles and Features", Section 4, p. 44.

Primary Examiner—Neil Abrams
Attorney, Agent, or Firm—Barnes & Thornburg

[57] ABSTRACT

A terminal connector head has a housing and a cover. The cover is removably mounted on the housing. The housing has an inner surface that has holes formed therein. The holes receive threaded inserts into which terminal screws are threaded. The holes are formed in pairs to provide for terminal strips. That is, two terminal screws are threaded into the threaded inserts in each pair of holes with a connecting link extending therebetween. The holes are located in the inner surface of the housing such that one or more of the threaded inserts in the holes will match holes or slots in a terminal block. The terminal block can then be mounted in the housing by using the threaded inserts which match up with the holes or slots in the terminal block. Illustratively, the terminal block has slots on either side. Each slot matches up with a threaded insert in one of the holes formed in the inner surface of the housing.

9 Claims, 1 Drawing Sheet

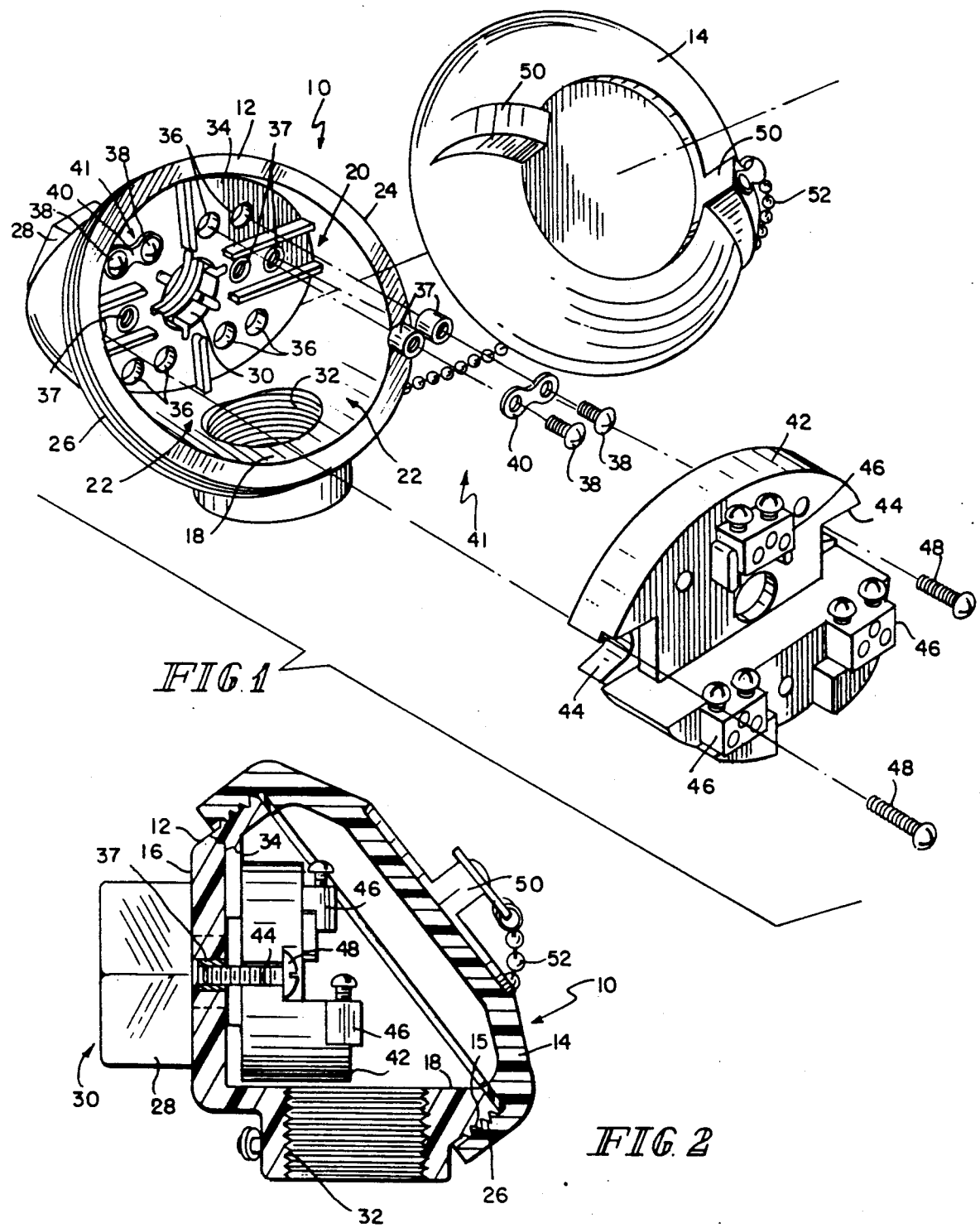

TERMINAL CONNECTOR HEAD

BACKGROUND AND SUMMARY OF THE INVENTION relates to terminal connector heads and more particularly to terminal connector heads used with temperature sensors.

Terminal connector heads are frequently used with temPerature sensors. A temperature sensor typically comprises a temperature sensing element, such as a thermocouple, encased in a protection tube. The sensing element provides or varies an electrical signal which is indicative of temperature. This electrical signal is transmitted to a process instrument which translates it into usable information. Such a process instrument might be a digital readout or an analog/digital converter.

Terminal connector heads must usually be used with temperature sensors because the sensing element typically has short lead wires. Consequently, these lead wires must be connected to other wires which are then run back to the process instrument. This interconnection is done in a terminal connector head and by the terminals and terminal strips in the terminal connector head.

The terminal connector head must be designed to withstand the environmental conditions which exist where it is mounted. Since it must typically be mounted very close to the process which is being sensed by the sensing element, these environmental conditions can be severe. For example, if a temperature sensor is used to sense high temperatures such as exist in furnaces, the terminal connector head can be exposed to very high temperatures.

Heretofore, terminal connector heads have typically comprised a housing with a cover. In one type of terminal connector head, a terminal block is mounted in the housing. In another type, the housing is formed with integral terminal strips. That is, holes are formed in the housing which receive threaded inserts. The terminal screws of the terminal strips are threaded into the threaded inserts.

The lead wires from the sensing element are run through a process opening in the housing and affixed to terminals of a terminal strip. For example, if the temperature sensing element has two lead wires, each lead wire would be attached to one terminal of respective two-terminal terminal strips. The other terminal of each terminal strip is connected to the process instrument by an appropriate type of wire which is typically run through a conduit.

Ceramic terminal blocks must sometimes be used to provide the necessary degree of insulation. In some cases, the thermoplastics which are temperature-resistant plastics of which the housing can be made do not provide sufficient insulation or temperature resistance.

Heretofore, the terminal connector heads have been one or the other of the above-described types. That is, they have either been a terminal connector head in which a terminal block is mounted in a housing or a terminal connector head having a housing with integral terminal strips. There has not been a terminal connector head which can interchangeably be either type.

It is an object of this invention to provide a terminal connector head having a housing with integral terminal strips in which a terminal block can be mounted.

It is another object of this invention to provide a terminal connector head that has terminals formed as integral parts of the housing wherein a terminal block can be mounted in the housing by using the holes formed in the housing for the integral terminals.

It is another object of this invention to provide a terminal connector head which is interchangeable between a terminal connector head with integral terminal strips and a terminal connector head in which a terminal block is mounted.

According to the present invention, a terminal connector head has a housing and a cover. The cover is removably mounted on the housing. The housing has an inner surface that has holes formed therein. The holes receive threaded inserts into which terminal screws are threaded. The holes are formed in pairs to provide for terminal strips. That is, two terminal screws are threaded into the threaded inserts in each pair of holes with a connecting link extending therebetween. The holes are located in the inner surface of the housing such that one or more of the threaded inserts in the holes will match holes or slots in a terminal block. The terminal block can then be mounted in the housing by using the threaded inserts which match up with the holes or slots in the terminal block. Illustratively, the terminal block has slots on either side. Each slot matches up with a threaded insert in one of the holes formed in the inner surface of the housing.

Additional features and advantages of the invention will become apparent to those skilled in the art upon consideration of the following detailed description of a preferred embodiment, exemplifying the best mode of carrying out the invention as presently perceived. The detailed description particularly refers to the accompanying figures in which:

BRIEF DESCRIPTION OF THE DRAWINGS

FIG. 1 is an exploded perspective view of a terminal connector head according to the invention; and FIG. 2 is a sectional view through the terminal connector head of FIG. 1.

Referring to the drawings, a terminal connector head 10 formed in accordance with the present invention is shown. Terminal connector head 10 has a housing 12 and a cover 14. Housing 12 is illustratively molded as a one-piece unit from a suitable material, such as a thermoplastic. One such thermoplastic is a crystalline thermoPlastic homopolymer marketed under the trademark DELRIN available from E. I. DuPont DeNemours & Co.

Housing 12 is formed as a right cylinder having an elliptical cross-section and cut along a diagonal forming an annular opening 20 which exposes substantially the entire interior 22 of housing 12. Annular opening 20 is surrounded by an annular perimeter 24 which has threads 26 formed on an outer surface thereof. Housing 12 has a flat sidewall 16 which is the base of the right cylinder and a curvelinear sidewall 18 which is the side of the right cylinder.

Flat sidewall 16 of housing 12 has a hexagonal nut 28 extending outwardly therefrom. A process opening 30 extends through nut 28 and flat sidewall 16 into the interior 22 of housing 12. An inner wall of nut 28 surrounding the process opening 30 is threaded. As is conventional, the protection tube or sheath of material surrounding a temperature sensing element is threaded at one end and is tightened into nut 28 to secure a temperature sensor (not shown) to terminal connector head 10.

Curvelinear sidewall 18 of housing 12 has a threaded conduit opening 32 extending therethrough. A conduit is screwed into threaded conduit opening 32 in conventional fashion to mate terminal connector head 10 to a conduit (not shown).

Flat sidewall 16 of housing 12 has an inner surface 34 facing the interior 22 of housing 12. Holes 36 are formed in the inner surface 34 of flat sidewall 16 of housing 12 for receiving threaded inserts 37. The holes 36 are formed in pairs to receive two threaded inserts 37 for receiving two terminal screws 38. It should be understood that while the use of threaded inserts is preferrable, they can be dispensed with. In this case, holes 36 would be threaded and the terminal screws would screw into threaded holes 36. Each pair of terminal screws 38 extend through a connecting link 40 which electrically connects the two terminal screws 38 of the pair of terminal screws 38 to form a terminal strip 41 as an integral part of the housing 12.

As is conventional, the sensing element (not shown) has lead wires (not shown). These lead wires are passed into the interior 22 of housing 12 through process opening 30. Each lead wire is fastened to one terminal screw 38 of a pair of terminal screws 38. An appropriate wire (not shown) for connecting each lead wire to a process instrument (not shown) is fastened to the other terminal screw 38 of the pair of terminal screws 38 and passed out through conduit opening 32.

Terminal connector head 10 can also have a terminal block 42. Terminal block 42 is formed from a material such as ceramic which has very high insulative and temperature resistance properties. In some cases, the thermoplastic material of which housing 12 is formed does not have sufficiently high insulative or temperature resistant properties to permit the terminal strips formed as integral parts of the housing to be used. In such instances, a separate terminal block such as terminal block 42 must be used.

Terminal block 42 is illustratively elliptical in shape having slots 44 at both ends of its major axis. A plurality of terminal block connecting elements 46 are mounted on terminal block 42. Terminal block connecting elements 46 are illustratively brass or nickel plated brass blocks having threaded holes formed therein which receive terminal screws.

The holes 36 formed in the inner surface 34 of housing 12 are positioned such that two holes will match the slots 44 of terminal block 42 when terminal block 42 is mounted in housing 12. Terminal block 42 can thus be mounted in housing 12 by screws 48 which pass through slots 44 and are threaded into the threaded inserts 37 in the matching holes 36 in housing 12. Thus, terminal block 42 makes use of the same holes 36 and threaded inserts 37 for mounting purposes that are used to receive the terminal screws 38 which form part of terminal strips 41 which are integral to the housing 12.

The cover 14 of terminal connector head 10 is illustratively a cap-like structure having an interior annular threaded perimeter 15. An opposed pair of ears or tabs 50 are formed on an outer surface of cover 14 to facilitate rotation of cover 14. Cover 14 screws onto housing 12 to enclose the annular opening 20 of housing 12. The inner threaded perimeter 15 of cover 14 threadably mates with the threads 26 on the annular perimeter 24 surrounding annular opening 20 of housing 12. A chain 52 is affixed to one of the tabs 50 on cover 14 and also to the housing 12. Chain 52 ensures that the cover 14 is not separated from the housing 12 when cover 14 is unscrewed from housing 12.

Although the invention has been described in detail with reference to certain preferred embodiments and specific examples, variations and modifications exist within the scope and spirit of the invention as described and as defined in the following claims.

What is claimed is:

1. A terminal connector head comprising a housing and a cover for removably mounting to the housing, the housing having holes formed in an inner surfaces for alternatively receiving one of electrically conducting terminal screws and attachment screws to permit an electrical connector and a terminal block to be alternatively mounted and secured in the housing with said screws being received in said holes, the electrical connector to be mounted and secured by use of the terminal screws and the terminal block to be mounted and secured by use of the attachment screws.

2. The terminal connector head of claim 1 wherein the terminal block is mounted in the housing by a plurality of said attachment screws which are received in a plurality of said holes.

3. The terminal connector head of claim 2 and further including a plurality of threaded inserts which are received in the holes in the inner surface of the housing, the threaded inserts threadably receiving the electrically conducting terminal screws.

4. The terminal head of claim 2 wherein said housing is formed from a thermoplastic material.

5. The terminal head of claim 1 wherein the housing has a threaded process opening and a threaded conduit opening.

6. The terminal head of claim 1 wherein the housing has an annular threaded perimeter and the cover has an annular threaded perimeter which threadably mates with the housing's annular threaded perimeter.

7. The terminal head of claim 3 wherein the housing has an annular threaded perimeter and the cover has an annular threaded perimeter which threadably mates with the housing's annular threaded perimeter.

8. A terminal connector head, comprising a housing molded from a thermoplastic material, a cover molded from a thermoplastic material, the cover removably mounted to the housing, the housing having an inner surface having pairs of holes for receiving threaded inserts therein, the threaded inserts received in each pair of holes threadably receiving terminal screws which extend through a connecting link to form a terminal strip integral with the housing, a terminal block for mounting on the inner surface of the housing, the terminal block mounted on the inner surface of the housing by a plurality of screws which thread into a plurality of the threaded inserts received in the holes formed in the inner surface of the housing wherein the terminal connector head is interchangeable between a terminal connector head with integral terminal strips and a terminal connector head with a terminal block mounted therein.

9. The terminal head and block assembly of claim 8 wherein the housing has formed therein a threaded process opening and a threaded conduit opening, the housing further having a threaded annular perimeter and the cover having a threaded annular perimeter which threadably mates with the housing's threaded annular perimeter to secure the cover to the housing.

* * * * *